(12) United States Patent
Konttinen

(10) Patent No.: US 7,054,552 B2
(45) Date of Patent: May 30, 2006

(54) VERTICAL AND HORIZONTAL PICTURES TAKEN WITHOUT CAMERA ROTATION

(75) Inventor: Marko Konttinen, Julkujärvi (FI)

(73) Assignee: Nokia Corporation, Espoo (FI)

( * ) Notice: Subject to any disclaimer, the term of this patent is extended or adjusted under 35 U.S.C. 154(b) by 145 days.

(21) Appl. No.: 10/877,793

(22) Filed: Jun. 25, 2004

(65) Prior Publication Data

US 2005/0286888 A1    Dec. 29, 2005

(51) Int. Cl.
*G03B 17/00*    (2006.01)
*H04N 5/262*    (2006.01)
*H04N 5/335*    (2006.01)

(52) U.S. Cl. .................. 396/435; 348/239; 348/294
(58) Field of Classification Search ................ 396/435, 396/436; 348/294, 239
See application file for complete search history.

(56) References Cited

U.S. PATENT DOCUMENTS

| | | | | |
|---|---|---|---|---|
| 5,452,109 A | * | 9/1995 | Compton | ................. 358/482 |
| 5,900,909 A | * | 5/1999 | Parulski et al. | .......... 348/231.6 |
| 5,943,518 A | * | 8/1999 | Sato | ............................ 396/429 |
| 6,064,834 A | * | 5/2000 | Fukuda et al. | ............. 396/380 |
| 6,148,149 A | * | 11/2000 | Kagle | .......................... 396/50 |
| 6,907,194 B1 | * | 6/2005 | Brost | ......................... 396/380 |
| 2002/0089593 A1 | * | 7/2002 | Tabata | ....................... 348/294 |

* cited by examiner

*Primary Examiner*—W. B. Perkey

(57) ABSTRACT

This invention describes a method for changing a picture orientation of a picture taken by an image sensor of an electronic device, e.g., for taking horizontal and vertical pictures, preferably having identical picture size and a picture aspect ratio, without changing an orientation of an electronic device containing said image sensor. The electronic device can be a camera, a portable communication device, a mobile electronic device or a mobile phone. When using a cross-shaped image sensor, both horizontal and vertical pictures can be taken without rotating the camera. The image sensor can have other shapes for accomplishing the same goal, e.g., square shape. A user interface needs just one button for choosing the orientation and the chosen orientation will be also seen on the display (viewfinder) of the electronic device. The viewfinder can have non-picture areas used for displaying image and photography information.

26 Claims, 4 Drawing Sheets

VERTICAL AND HORIZONTAL PICTURES TAKEN WITHOUT CAMERA ROTATION

TECHNICAL FIELD

This invention generally relates to digital cameras and more specifically to taking horizontal and vertical pictures without changing an orientation of an electronic device containing said camera.

BACKGROUND ART

1. Field of Technology and Background

It is well known that, when taking any kind of picture with a conventional film camera or a digital camera, the camera has to be rotated depending on a picture alignment wanted, e.g., horizontal (landscape) or vertical (portrait). Some cameras are not designed to be easily tilted manually and due to an uncomfortable grip there is a high probability of fingers, carrying straps, etc. to be in front of a camera lens or a flash light during picture taking thus damaging pictures. Professional system cameras have special arrangements to make it easier taking portrait photos. But still the photographer has to change the alignment of the camera. This can be especially important when professionals use their cameras in the events where the moment can be missed during rotating the camera (e.g., sport photography).

2. Problem Formulation

When digital cameras emerged, the conventional 35 mm film was removed from the camera and it was replaced with an image sensor. The shape of the image sensor was the same as that of the film. This enables taking only one picture shape using this type of digital cameras when a total active area of the image sensor is used. It is desirable to expand this capability, so pictures with various picture orientations (e.g., vertical, horizontal, etc.) can be taken while maintaining the same picture shape and aspect ratio for all orientations and avoiding moving the camera for changing the picture orientation.

3. Prior Art

Normal compact digital cameras are meant to be used by tilting 90° to the right or left when taking vertical pictures. But the grip is almost always so uncomfortable in this type of orientations that the normal touch can be lost. This causes abnormal holding and possibility of inserting fingers, carrying straps, etc. in front of the lens or the flash light and damaging pictures.

Professional cameras have two handle grips and two shutter release buttons, two main dial wheels, two AE locking buttons, etc., thus providing almost a complete set of controls for both handles and having a similar touch when taking both horizontal and vertical pictures.

In today's new digital cameras there is a camera alignment sensor inside the camera which detects the orientation of the camera, and the vertical picture (taken with the camera tilted 90° to right/left) is automatically rotated to an upright position (the right orientation) for more convenient viewing on the screen when previewing the pictures. But in that solution the size of the vertical picture on the screen is smaller than in a horizontal case because the height of the screen is limiting the height of the picture to be viewed. The user still has to rotate pictures using an image processing tool before use.

Mobile phone cameras are meant to be used with the phone orientated vertically (in the orientation where it is used while using it as a phone). In that case the image sensor produces a horizontal picture. Some phones (e.g., Nokia 3650) have a portrait mode which takes vertical pictures. But in that case the picture size is smaller than in the horizontal picture. In the vertical picture the height of the picture is the same as in the horizontal picture but the width and thus the area is only 56% of the horizontal picture width (if the aspect ratio of the pictures is the same).

Disclosure of the Invention

The object of the present invention is to provide a methodology for changing a picture orientation of a picture taken by an image sensor of an electronic device, e.g., for taking horizontal and vertical pictures without changing an orientation of an electronic device containing said image sensor, according to the present invention.

According to a first aspect of the invention, a method for changing an orientation of a picture taken by an image sensor of an electronic device without changing an orientation of the electronic device, comprising the steps of: providing a picture orientation command signal to a picture orientation switch of the electronic device by a user; providing a readout switch signal to a sensor readout module by the picture orientation switch in response to the picture orientation command signal; and switching the picture orientation in the sensor readout module from an initial picture orientation to a further picture orientation in response to the readout switch signal before the picture is taken by the image sensor of the electronic device, wherein the initial picture orientation is one of M possible picture orientations available for switching in the sensor readout module and the further picture orientation is one of the remaining M−1 possible picture orientations, M in an integer of at least a value of two.

According further to the first aspect of the invention, a picture size and a picture aspect ratio for all the M possible picture orientations may be identical.

Further according to the first aspect of the invention, the initial picture orientation may be set to a predetermined default picture orientation when an electric power is turned on in the electronic device. Further, the predetermined default picture orientation may be a horizontal orientation. Still further, the method may further comprise the steps of: providing a picture taking command signal to the readout module by the user; and providing a readout signal to the image sensor by the sensor readout module in response to the picture taking command signal for taking the picture with the further picture orientation using only an active area of the image sensor which corresponds to the further picture orientation. Yet still further, the method may further comprise the step of: automatically re-setting the further picture orientation to the predetermined default picture orientation after the picture with the further picture orientation is taken. Yet further still, the picture taking command signal may be provided by the user through a user interface.

Still further according to the first aspect of the invention, a non-picture area of an image viewfinder of the electronic device may be used for displaying image and photography information related to the picture, wherein the non-picture area is an area of the image viewfinder which does not correspond to an active area of the image sensor used for taking a picture with the initial picture orientation or with the further picture orientation, or which is not used for taking pictures with any combination of the M picture orientations.

According further to the first aspect of the invention, the image sensor may have a cross shape or a square shape.

According still further to the first aspect of the invention, the image sensor may be a charged-coupled device (CCD) or a complimentary metal oxide semiconductor (CMOS).

According further still to the first aspect of the invention, the initial picture orientation may be a horizontal picture orientation or a vertical picture orientation and the further picture orientation may be the vertical picture orientation or the horizontal picture orientation, respectively.

According yet further still to the first aspect of the invention, the electronic device may be a camera, a portable communication device, a mobile electronic device or a mobile phone.

According to a second aspect of the invention, an electronic device capable of taking a picture with different picture orientations without changing an orientation of the electronic device, comprising: a picture orientation switch, responsive to a picture orientation command signal from a user, for providing a readout switch signal; a sensor readout module, responsive to the readout switch signal, for providing a readout signal, wherein the picture orientation in the sensor readout module is switched from an initial picture orientation to a further picture orientation in response to the readout switch signal, the initial picture orientation is one of M possible picture orientations available for switching in the sensor readout module and the further picture orientation is one of the remaining M−1 possible picture orientations, M in an integer of at least a value of two; and an image sensor, responsive to the readout signal, for taking the picture with any of the M possible picture orientations.

According further to the second aspect of the invention, a picture size and a picture aspect ratio for all the M possible picture orientations may be identical.

Further according to the second aspect of the invention, the initial picture orientation may be set to a predetermined default picture orientation when an electric power is turned on in the electronic device. Further, the predetermined default picture orientation may be a horizontal orientation. Still further, the readout signal to the image sensor may be provided in response to a picture taking command signal provided to the sensor readout module for taking the picture with the further picture orientation using only an active area of the image sensor which corresponds to the further picture orientation. Yet still further, the picture taking command signal may be provided by the user through a user interface. Yet further still, after taking the picture with the further picture orientation, the further picture orientation may be automatically re-set to the predetermined default picture orientation Still further according to the second aspect of the invention, a non-picture area of an image viewfinder of the electronic device may be used for displaying image and photography information related to the picture, wherein the non-picture area is an area of the image viewfinder which does not correspond to an active area of the image sensor used for taking the picture with the initial picture orientation or with the further picture orientation, or which is not used for taking pictures with any combination of the M picture orientations.

According further to the second aspect of the invention, the image sensor may have a cross shape or a square shape.

According still further to the second aspect of the invention, the image sensor may be a charged-coupled device (CCD) or complimentary metal oxide semiconductor (CMOS).

According further still to the second aspect of the invention, the initial picture orientation may be a horizontal picture orientation or a vertical picture orientation and the further picture orientation may be the vertical picture orientation or the horizontal picture orientation, respectively.

According yet further still to the second aspect of the invention, the electronic may be a camera, a portable communication device, a mobile electronic device or a mobile phone.

According to a third aspect of the invention, a cross-shaped image sensor for taking pictures with two perpendicular orientations, comprising: a square set of pixels with four perimeter sides A; and four rectangular sets of the pixels each attached to one of the four perimeter sides A of the square set of the pixels by one rectangular perimeter side equals to the perimeter side A, wherein, when one picture orientation of the two perpendicular orientations is required, the pixels are activated in the square set of the pixels and in two of the four rectangular sets of the pixels attached to corresponding opposite sides of the square set of the pixels and, when another picture orientation perpendicular to the one picture orientation is required, the pixels are activated in the square set of the pixels and in further two of the four rectangular sets of the pixels attached to further opposite sides of the square set of the pixels, the further opposite sides being perpendicular to the corresponding opposite sides of the square set of the pixels.

According further to the third aspect of the invention, all the four rectangular sets of the pixels may be equal.

BRIEF DESCRIPTION OF THE DRAWINGS

For a better understanding of the nature and objects of the present invention, reference is made to the following detailed description taken in conjunction with the following drawings, in which.

BEST MODE FOR CARRYING OUT THE INVENTION

The present invention provides a new methodology for changing a picture orientation of a picture taken by an image sensor of an electronic device, e.g., for taking horizontal and vertical pictures, preferably having identical picture size and a picture aspect ratio, without changing an orientation of an electronic device containing said image sensor, according to the present invention. The electronic device can be a camera, a portable communication device, a mobile electronic device or a mobile phone.

When using a cross-shaped image sensor, both horizontal and vertical pictures can be shot without rotating the electronic device (e.g., camera). It is easy, fast and ergonomic. User interface needs just one button (picture orientation switch) for choosing the orientation and the chosen orientation will be seen on the screen (a display or a viewfinder), both horizontal and vertical pictures can be taken without rotating the camera. The image sensor can have various shapes, e.g., a cross shape, or a square shape as discussed below. An image viewfinder (equivalently called a display or a viewfinder) of the electronic device can have non-picture areas to be used for displaying image and photography information. According to the present invention, a user interface can also have a specified key on the keypad of the electronic device or a simple button on the backside of the electronic device for choosing orientation of the picture to be shot. Default setting can be a horizontal picture.

Figure 1:
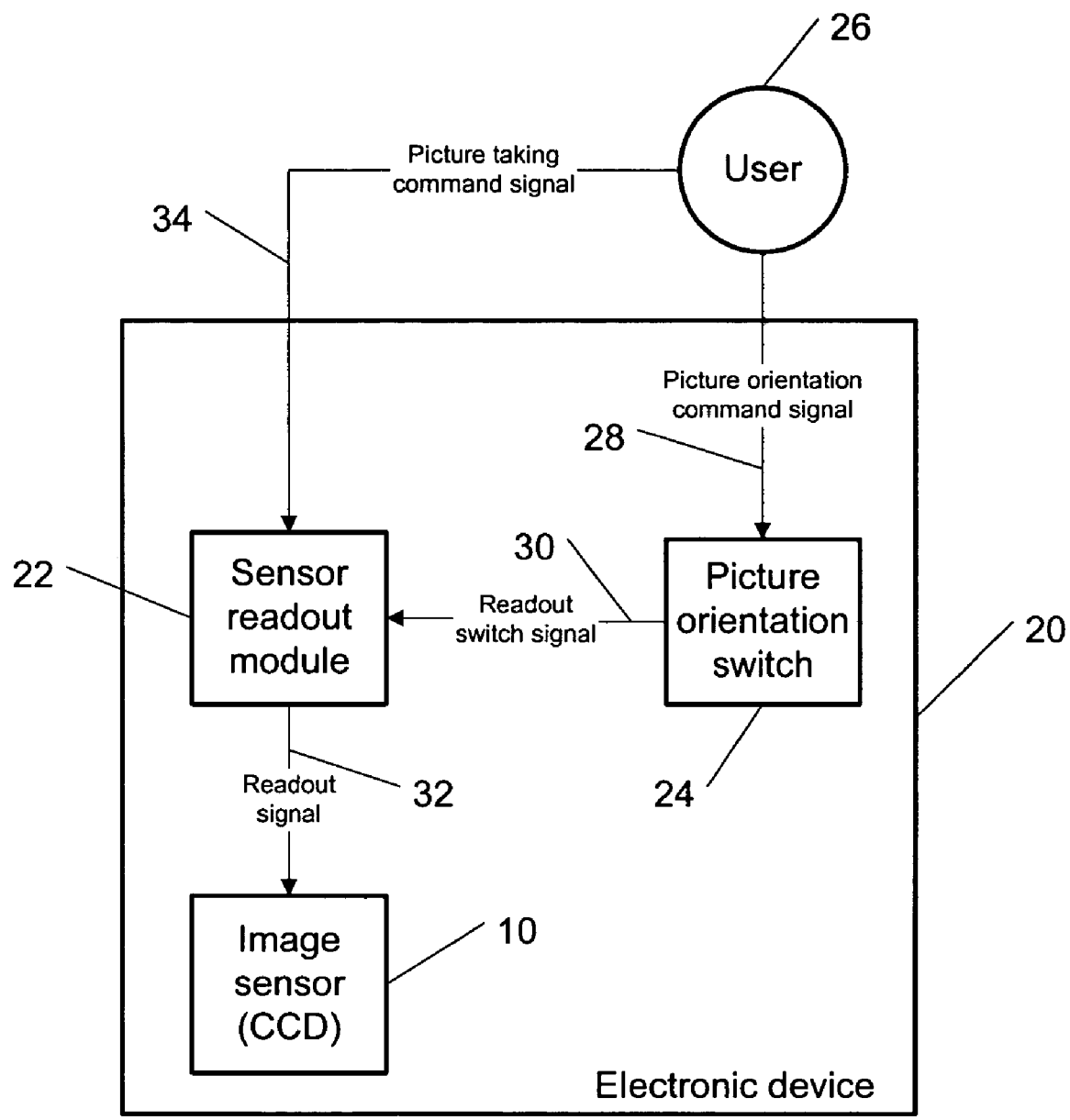
FIG. 1 shows an example of a block diagram of an electronic device capable of taking pictures of various orientations (e.g., horizontal, vertical, etc.) without changing a position of said electronic device, according to the present invention.

FIG. 1 shows one example among others of a block diagram of an electronic device 20 (e.g., a camera, a portable communication device, a mobile electronic device or a mobile phone) capable of taking pictures of various orientations (e.g., horizontal, vertical, etc.) without changing position of said electronic device, according to the present invention.

The initial orientation of the picture to be taken by the electronic device 20, when the electronic device power is turned on (device is powered), is automatically set to a predetermined default picture orientation, e.g. a horizontal picture orientation. A picture orientation switch 24 of the electronic device 20 is used by a user 26 for switching the picture orientation by sending a picture orientation command signal 28. The picture orientation switch 24 is a user interface which can be a simple specified key on the keypad of the electronic device 20 or a simple button on the backside of the electronic device 20. In response to the picture orientation command signal 28, the picture orientation switch 24 provides a readout switch signal 30 to a sensor readout module 22 of said electronic device 20. In response to the readout switch signal 30, the sensor readout module 22 switches said picture orientation from an initial picture orientation to a further picture orientation. Then the user 26 provides a picture taking command signal 34 to the sensor readout module 22 (e.g., through a user interface, not shown in FIG. 1). In response to the picture taking command signal 34, the sensor readout module 22 provides a readout signal 32 to the image sensor 10 for taking a picture with said further picture orientation using only an active area of the image sensor 10, which corresponds to said further picture orientation. The image sensor 10 can be a charged-coupled device (CCD), a complimentary metal oxide semiconductor (CMOS) or can be based on some other emerging technology and have various shapes, which is discussed below in detail. After taking said picture with the further picture orientation, in one possible scenario said further picture orientation can be automatically re-set to said predetermined default picture orientation. Alternatively, said further picture orientation can stay chosen (unchanged) until further command (signal 28) from the user 26.

The initial picture orientation is one of M possible picture orientations available for switching in said sensor readout module 22 and said further picture orientation is one of said remaining M−1 possible picture orientations, M in an integer of at least a value of two, and a picture size and a picture aspect ratio for all said M possible picture orientations being identical, according to the present invention. For example, the initial picture orientation can be a horizontal picture orientation and the further picture orientation can be a vertical picture orientation with M=2.

Figure 2:
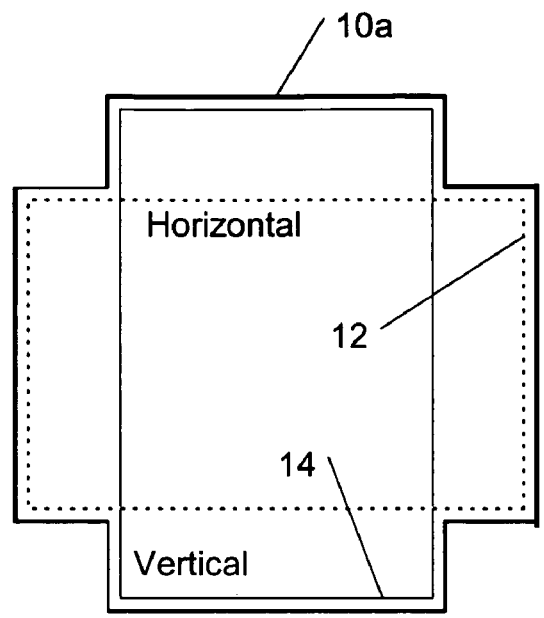
FIG. 2 shows an example of an image sensor (thick line) with a horizontally oriented picture area (thin line) and a vertically oriented picture area (dotted line), according to the present invention.

FIG. 2 shows one example among others of the image sensor 10 (thick line) with a horizontally oriented picture area (dotted line) 12 and a vertically oriented picture area (thin line) 14, according to the present invention.

In a horizontal case the image sensor 10 uses an area 12 marked with dotted outline. This is the situation also in existing cameras. When the user 26 wants to take a vertical picture, the user 26 has to push once the orientation choosing button (the picture orientation switch 24) to select a vertical orientation picture mode. Then a vertical picture can be shot without rotating the camera. In a vertical mode the image sensor 10 uses an area 14 marked with thin outline. The vertical orientation picture mode will remain chosen as long as the picture orientation mode is changed to the horizontal mode by the user 26 or the camera is shut down, or alternatively can be automatically changed back to the horizontal mode by default as described above.

The image sensor 10 can have a shape of a cross 10a as shown in FIG. 2 in one preferred embodiment of the present invention in order to provide the identical picture size and an identical picture aspect ratio for the pictures with different orientations (e.g., vertical or horizontal). Especially this cross shape can be beneficial if the price of the image sensor 10 significantly depends on the area (number of pixels) of the sensor. But other shapes are also possible. For example, the image sensor 10 can have a square shape. The square shape can provide the same picture orientation capabilities as the cross shape discussed above, according to the present invention, but also add additional benefits to the electronic device 20 (such as a photographic camera) for taking square pictures (compare to exclusive Hasselblad 6×6 cm film studio cameras).

In an alternative solution, it is possible to save the whole image sensor 10 area to memory media and let the user choose the picture orientation in the picture transfer software (e.g., camera manufacturer's dedicated software for transferring the pictures from the camera to a computer) when the picture is transferred to PC for further use.

Figure 3:
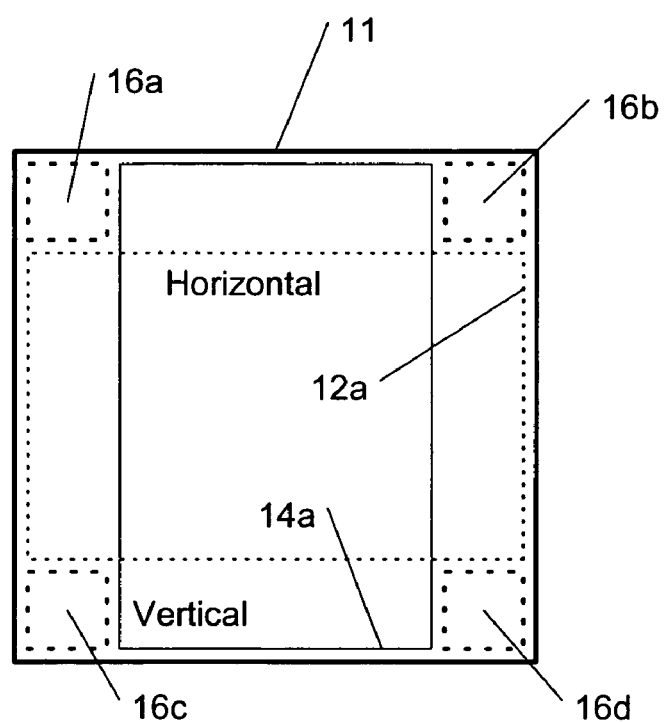
FIG. 3 shows an example of an image viewfinder (thick line) with a horizontally oriented picture area (thin line) and a vertically oriented picture area (dotted line) and further shows non-picture areas (thick dotted lines) used for displaying image and photography information, according to the present invention.

FIG. 3 shows an example among others of an image viewfinder (or display) 11 (thick line) of a square shape with a horizontally oriented picture display area (dotted line) 12a and a vertically oriented picture display area (thin line) 14a and further shows non-picture areas (thick dotted lines) used for displaying image and photography information, according to the present invention. As in the case of the image sensor 10, the viewfinder 11 is capable of providing the identical picture size and picture aspect ratio for the pictures with different orientations (e.g., vertical or horizontal). The viewfinder 11 is not shown in FIG. 1 but, in general, it is a part of the electronic device 20.

As shown in FIG. 3, there is a free (empty) space (empty corners) on the screen of the viewfinder 11 for viewing the information related to image and photography. This free space is identified as a non-picture areas 16a, 16b, 16c and 16d (thick dotted line) of the image viewfinder 11 and can be used for displaying image and photography information related to said picture instead of showing the image and photography information in the picture display areas (e.g., areas 12a and 14a). The present practice is to view this information in the picture area which disturbs checking/ dissection (i.e., exposure, focus, color depth, cropping) of the picture. Therefore, the square shape of a screen of the viewfinder 11 can be a preferred solution for using non-picture areas 16a, 16b, 16c and 16d for displaying the image and photography information. According to the present invention, the non-picture area (or the free space) can be defined in general as an area of the viewfinder 11 which does not corresponds to an active area of the image sensor 10 used for taking a picture with the initial picture orientation or with said further picture orientation, or which is not used for taking pictures with any combination of said M picture orientations.

The image and photography information can contain symbols, texts and numerical values related to imaging and photographing technology, e.g. frame number, exposure time, objective aperture, used program, image size, image quality, focusing, flash light usage, battery level, etc. This data is more clearly visible in a separate area than on the top of the picture in different light conditions and/or picture or background colors. These areas 16a, 16b, 16c and 16d can be important especially in professional cameras' optical viewfinders but can also be used in all kind of displays.

Figure 4A:
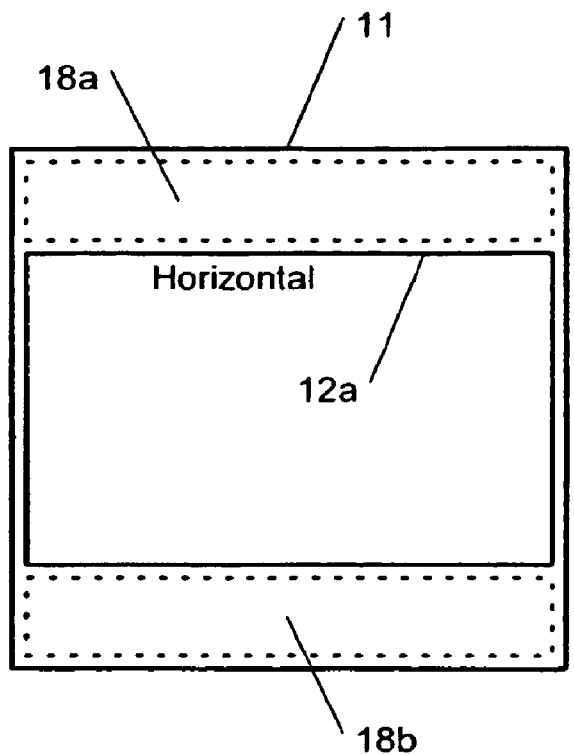
FIGS. 4a and 4b show examples of an image viewfinder with a horizontally oriented picture area (thin line) and a vertically oriented picture area (dotted line), and further show non-picture areas (thick dotted lines) used for displaying image and photography information, according to the present invention.
Figure 4B:
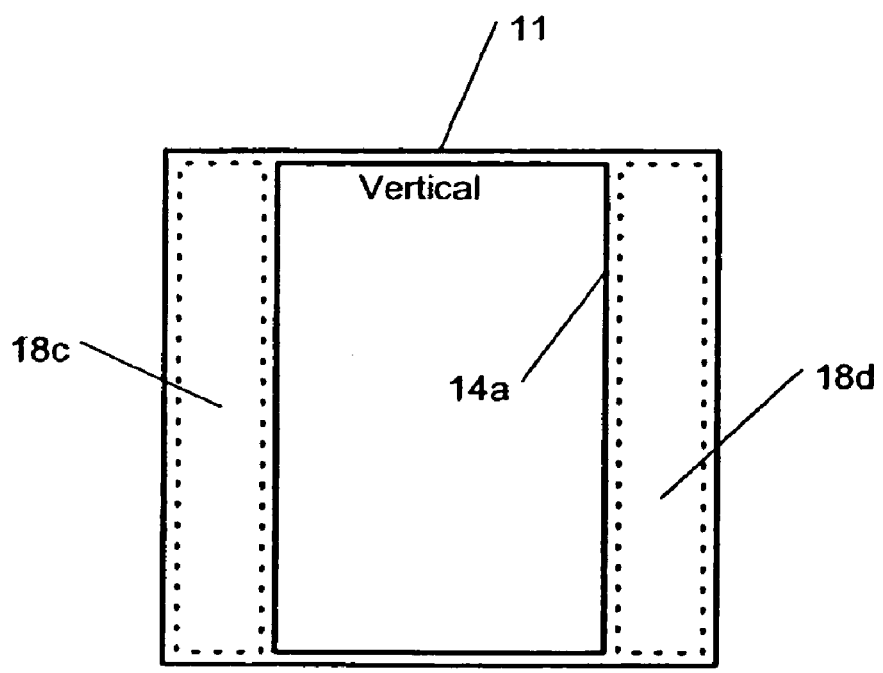

FIGS. 4a and 4b show more examples of an image viewfinder 11 with a horizontally oriented picture display area (dotted line) 12a and a vertically oriented picture display area (thin line) 14a, and further show non-picture areas (thick dotted lines) 18a and 18b, 18c and 18d, respectively, used for displaying image and photography information, according to the present invention. This enables larger areas, compared to the example of FIG. 3, to be used for displaying the image and photography information but causes the need to change the place of symbols and numbers depending on orientation of the picture.

Figure 5:
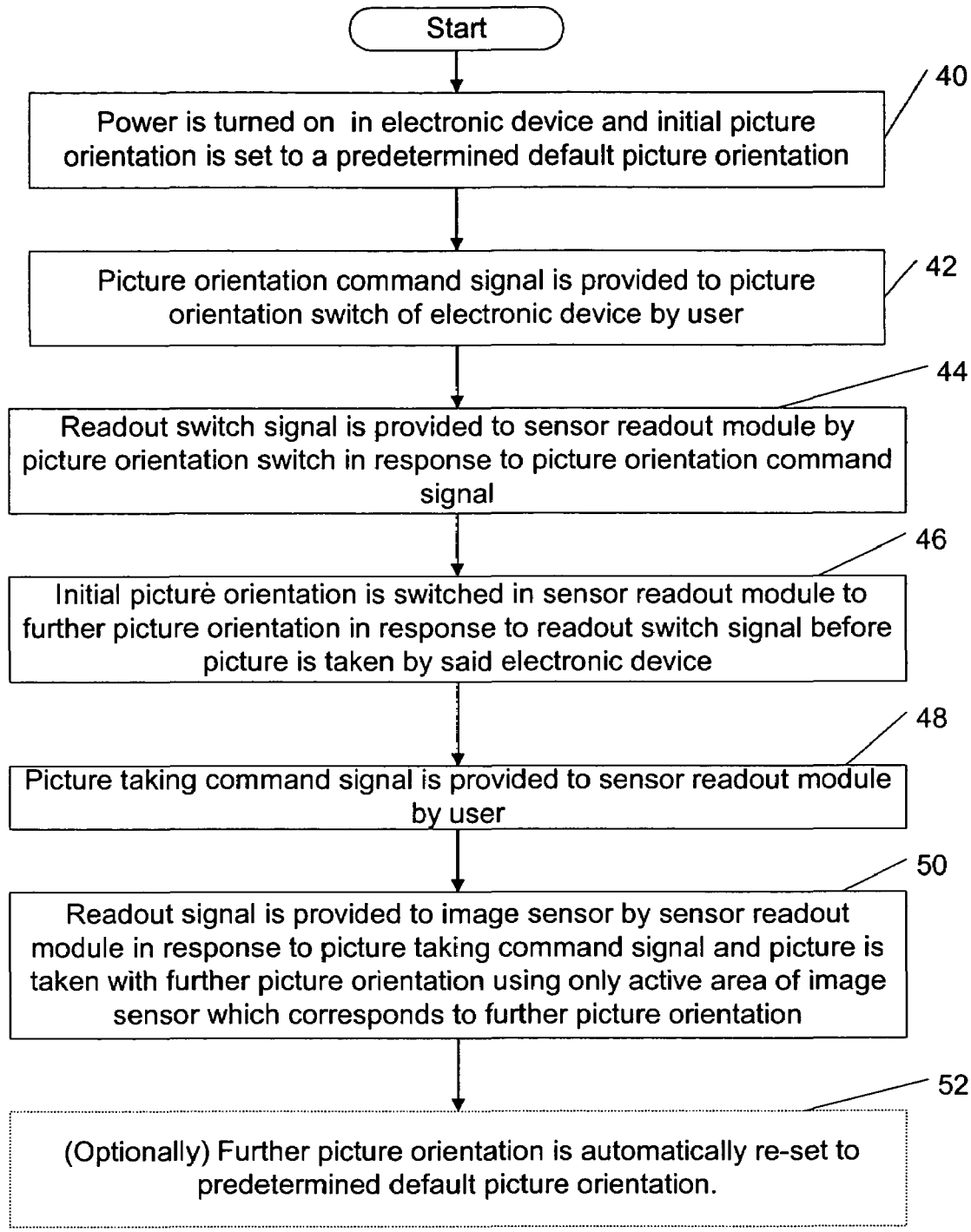
FIG. 5 shows an example of a flow chart of operation of an electronic device capable of taking pictures of various orientations (e.g., horizontal, vertical, etc.) without changing a-position of said electronic device, according to the present invention.

FIG. 5 shows an example of a flow chart of operation of an electronic device 20 capable of taking pictures of various orientations (e.g., horizontal, vertical, etc.) without changing position of said electronic device 20, according to the present invention.

The flow chart of FIG. 5 represents only one possible scenario among many others. In a method according to the present invention, in a first step 40, the initial orientation of the picture to be taken by the electronic device 20, when the electronic device power is turned on (device is powered), is automatically set to a predetermined default picture orientation, e.g. the horizontal picture orientation. In a next step 42, the picture orientation command signal 28 is provided to the picture orientation switch 24 of the electronic device 20 by the user 26 for switching the picture orientation. In a next step 44, the picture orientation switch 24 provides a readout switch signal 30 to a sensor readout module 22 in response to the picture orientation command signal 28. In a next step 46, the sensor readout module 22 switches said picture orientation from the initial picture orientation to the further picture orientation in response to the readout switch signal 30. In a next step 48, the picture taking command signal 34 is provided to the sensor readout module 22 (e.g., through the user interface, not shown in FIG. 1) by the user 26. In a next step 50, in response to the picture taking command signal 34, the sensor readout module 22 provides the readout signal 32 to the image sensor 10 for taking the picture with said further picture orientation using only the active area of the image sensor 10 which corresponds to said further picture orientation. Finally, in a next step 52, after taking said picture with the further picture orientation, said further picture orientation is automatically re-set to said predetermined default picture orientation (this is an optional step).

What is claimed is:

1. A method for changing an orientation of a picture taken by an image sensor of an electronic device without changing an orientation of said electronic device, comprising the steps of:
   providing a picture orientation command signal to a picture orientation switch of the electronic device by a user;
   providing a readout switch signal to a sensor readout module by the picture orientation switch in response to said picture orientation command signal; and
   switching said picture orientation in said sensor readout module from an initial picture orientation to a further picture orientation in response to said readout switch signal before said picture is taken by the image sensor of said electronic device, wherein said initial picture orientation is one of M possible picture orientations available for switching in said sensor readout module and said further picture orientation is one of said remaining M−1 possible picture orientations, M in an integer of at least a value of two.

2. The method of claim 1, wherein a picture size and a picture aspect ratio for all said M possible picture orientations are identical.

3. The method of claim 1, wherein said initial picture orientation is set to a predetermined default picture orientation when an electric power is turned on in said electronic device.

4. The method of claim 3, wherein said predetermined default picture orientation is a horizontal orientation.

5. The method of claim 3, further comprising the steps of:
   providing a picture taking command signal to the readout module by the user; and
   providing a readout signal to the image sensor by the sensor readout module in response to the picture taking command signal for taking the picture with said further picture orientation using only an active area of the image sensor which corresponds to said further picture orientation.

6. The method of claim 5, further comprising the step of:
   automatically re-setting said further picture orientation to said predetermined default picture orientation after said picture with the further picture orientation is taken.

7. The method of claim 5, wherein said picture taking command signal is provided by the user through a user interface.

8. The method of claim 1, wherein a non-picture area of an image viewfinder of said electronic device is used for displaying image and photography information related to said picture, wherein said non-picture area is an area of the image viewfinder which does not correspond to an active area of the image sensor used for taking a picture with the initial picture orientation or with said further picture orientation, or which is not used for taking pictures with any combination of said M picture orientations.

9. The method of claim 1, wherein said image sensor has a cross shape or a square shape.

10. The method of claim 1, wherein said image sensor is a charged-coupled device (CCD) or a complimentary metal oxide semiconductor (CMOS).

11. The method of claim 1, wherein said initial picture orientation is a horizontal picture orientation or a vertical picture orientation and said further picture orientation is the vertical picture orientation or the horizontal picture orientation, respectively.

12. The method of claim 1, wherein said electronic device is a camera, a portable communication device, a mobile electronic device or a mobile phone.

13. An electronic device capable of taking a picture with different picture orientations without changing an orientation of the electronic device, comprising:
   a picture orientation switch, responsive to a picture orientation command signal from a user, for providing a readout switch signal;
   a sensor readout module, responsive to the readout switch signal, for providing a readout signal, wherein said picture orientation in said sensor readout module is switched from an initial picture orientation to a further picture orientation in response to said readout switch signal, said initial picture orientation is one of M possible picture orientations available for switching in said sensor readout module and said further picture orientation is one of said remaining M−1 possible picture orientations, M in an integer of at least a value of two; and
   an image sensor, responsive to the readout signal, for taking said picture with any of said M possible picture orientations.

14. The electronic device of claim 13, wherein a picture size and a picture aspect ratio for all said M possible picture orientations are identical.

15. The electronic device of claim 13, wherein said initial picture orientation is set to a predetermined default picture orientation when an electric power is turned on in said electronic device.

16. The electronic device of claim 15, wherein said predetermined default picture orientation is a horizontal orientation.

17. The electronic device of claim 15, wherein said readout signal to the image sensor is provided in response to a picture taking command signal provided to the sensor readout module for taking the picture with said further picture orientation using only an active area of the image sensor which corresponds to said further picture orientation.

18. The electronic device of claim 17, wherein said picture taking command signal is provided by the user through a user interface.

19. The electronic device of claim 17, wherein, after taking said picture with the further picture orientation, said further picture orientation is automatically re-set to said predetermined default picture orientation.

20. The electronic device of claim 13, wherein a non-picture area of an image viewfinder of said electronic device is used for displaying image and photography information related to said picture, wherein said non-picture area is an area of the image viewfinder which does not correspond to an active area of the image sensor used for taking the picture with the initial picture orientation or with said further picture orientation, or which is not used for taking pictures with any combination of said M picture orientations.

21. The electronic device of claim 13, wherein said image sensor has a cross shape or a square shape.

22. The electronic device of claim 13, wherein said image sensor is a charged-coupled device (CCD) or complimentary metal oxide semiconductor (CMOS).

23. The electronic device of claim 13, wherein said initial picture orientation is a horizontal picture orientation or a vertical picture orientation and said further picture orientation is the vertical picture orientation or the horizontal picture orientation, respectively.

24. The electronic device of claim 13, wherein said electronic device is a camera, a portable communication device, a mobile electronic device or a mobile phone.

25. A cross-shaped image sensor for taking pictures with two perpendicular orientations, comprising:
   a square set of pixels with four perimeter sides A; and four rectangular sets of the pixels each attached to one of said four perimeter sides A of said square set of the pixels by one rectangular perimeter side equals to the perimeter side A,
   wherein, when one picture orientation of said two perpendicular orientations is required, the pixels are activated in said square set of the pixels and in two of the four rectangular sets of the pixels attached to corresponding opposite sides of the square set of the pixels and, when another picture orientation perpendicular to said one picture orientation is required, the pixels are activated in said square set of the pixels and in further two of the four rectangular sets of the pixels attached to further opposite sides of the square set of the pixels, said further opposite sides being perpendicular to said corresponding opposite sides of the square set of the pixels.

26. The image sensor of claim 25, wherein all said four rectangular sets of the pixels are equal.

* * * * *